`US011730288B2`

United States Patent
Luo et al.

(10) Patent No.: US 11,730,288 B2
(45) Date of Patent: Aug. 22, 2023

(54) DISPLAY DEVICE AND SUPPORT STRUCTURE THEREOF

(71) Applicant: BOE Technology Group Co., Ltd., Beijing (CN)

(72) Inventors: Xiaofei Luo, Beijing (CN); Shangchieh Chu, Beijing (CN); Yanyan Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 580 days.

(21) Appl. No.: 16/887,730

(22) Filed: May 29, 2020

(65) Prior Publication Data

US 2021/0169242 A1    Jun. 10, 2021

(30) Foreign Application Priority Data

Dec. 4, 2019  (CN) .......................... 201922155134.1

(51) Int. Cl.
| | |
|---|---|
| *G06F 1/16* | (2006.01) |
| *A47G 5/02* | (2006.01) |
| *G09F 15/00* | (2006.01) |
| *G09F 9/30* | (2006.01) |

(52) U.S. Cl.
CPC ............... *A47G 5/02* (2013.01); *G09F 9/301* (2013.01); *G09F 15/0012* (2013.01); *G09F 15/0062* (2013.01); *G06F 1/1652* (2013.01)

(58) Field of Classification Search
CPC .............................. G06F 1/1681; G06F 1/1652
See application file for complete search history.

(56) References Cited

U.S. PATENT DOCUMENTS

| | | | | |
|---|---|---|---|---|
| 7,830,333 | B2* | 11/2010 | Aoki ................... | H04M 1/0268 345/1.3 |
| 8,259,437 | B2* | 9/2012 | Vesely ................. | G06F 1/1679 345/184 |
| 8,493,726 | B2* | 7/2013 | Visser .................... | G09F 9/301 361/679.05 |
| 9,743,542 | B2* | 8/2017 | Heo ..................... | H05K 5/0226 |
| 9,756,757 | B2* | 9/2017 | Park ......................... | H05K 7/16 |
| 9,864,412 | B2* | 1/2018 | Park ...................... | G06F 1/1652 |
| 9,971,383 | B2* | 5/2018 | Liu ........................ | G06F 1/1626 |
| 10,430,923 | B2* | 10/2019 | Lu .......................... | H05K 1/028 |
| 10,499,515 | B2* | 12/2019 | Lee ...................... | H05K 5/0226 |
| 10,586,475 | B2* | 3/2020 | Park ........................ | G09F 9/301 |

(Continued)

*Primary Examiner* — Rockshana D Chowdhury
*Assistant Examiner* — Douglas R Burtner
(74) *Attorney, Agent, or Firm* — Nath, Goldberg & Meyer; Joshua B. Goldberg

(57) ABSTRACT

The present disclosure provides a display device and a support structure thereof, the support structure being configured to support a flexible display screen and comprising a support component and a synchronous transmission component, wherein: the support component comprises two telescopic rods, and has a fixed side fixed relative to a fixed side edge of the flexible display screen, and a movable side extendable and retractable with expansion or winding of a movable side edge of the flexible display screen; and the synchronous transmission component is connected to the support component, and is configured to move ends of the two telescopic rods on the movable side of the support component synchronously in a direction parallel to the movable side edge of the flexible display screen.

8 Claims, 3 Drawing Sheets

(56) References Cited

U.S. PATENT DOCUMENTS

| | | | |
|---|---|---|---|
| 10,753,528 B2* | 8/2020 | Wu | F16M 11/22 |
| 10,890,947 B2* | 1/2021 | Choi | H05K 5/0017 |
| 11,064,300 B2* | 7/2021 | Kim | G06F 1/1605 |
| 11,089,699 B2* | 8/2021 | Park | H05K 1/189 |
| 11,249,518 B2* | 2/2022 | Liao | G04G 9/00 |
| 11,372,447 B2* | 6/2022 | Liao | G06F 1/1677 |
| 2008/0144265 A1* | 6/2008 | Aoki | G06F 1/1641 |
| | | | 361/679.04 |
| 2014/0247544 A1* | 9/2014 | Ryu | G09F 11/18 |
| | | | 361/679.01 |
| 2018/0114471 A1* | 4/2018 | Park | G06F 1/1652 |
| 2019/0230803 A1* | 7/2019 | Liao | H05K 5/0221 |
| 2020/0201394 A1* | 6/2020 | Choi | G06F 1/1652 |
| 2020/0314552 A1* | 10/2020 | Kim | G06F 1/182 |

* cited by examiner

DISPLAY DEVICE AND SUPPORT STRUCTURE THEREOF

CROSS-REFERENCE TO RELATED APPLICATION

This application claims priority from Chinese patent application No. 201922155134.1 filed with China National Intellectual Property Administration (CNIPA) on Dec. 4, 2019, the disclosure of which is incorporated herein by reference.

TECHNICAL FIELD

The present disclosure relates to the technical field of display devices, and particularly relates to a display device and a support structure thereof.

BACKGROUND

With the progress of science and technology and the development of society, flexible display devices have gradually come into the view of consumers. By virtue of some characteristics like being bendable and windable, flexible display panels bring brand new user experience for consumers, and further facilitate the life of consumers.

However, an inclined screen may occur in a current flexible display device when the flexible display screen is wound due to asynchronous movement of a bracket under the screen, and an edge of the screen can be easily damaged when the screen is wound.

SUMMARY

To solve at least one of the problems in the related art, the present disclosure provides a display device and a support structure thereof.

To achieve the objects of the present disclosure, in a first aspect, there is provided a support structure for supporting a flexible display screen, including a support component and a synchronous transmission component, wherein: the support component includes two telescopic rods, and has a fixed side fixed relative to a fixed side edge of the flexible display screen, and a movable side extendable and retractable with expansion or winding of a movable side edge of the flexible display screen; and the synchronous transmission component is connected to the support component, and is configured to move ends of the two telescopic rods on the movable side of the support component synchronously in a direction parallel to the movable side edge of the flexible display screen.

Optionally, each of the telescopic rods includes a plurality of sub-links hinged end to end and having the same length; and the sub-links of the two telescopic rods are hinged in a one-to-one correspondence manner with a hinged position located at a central position of the two hinged sub-links; and two ends of each telescopic rod are respectively used as the fixed side and the movable side.

Optionally, the synchronous transmission component includes two synchronization groups and two transmission groups, wherein one of the synchronization groups is connected to the fixed sides of the two telescopic rods, and the other of the synchronization groups is connected to the movable sides of the two telescopic rods; each of the synchronization groups includes a fixed member and two movable members, wherein the ends of the two telescopic rods are connected to the fixed member in a relatively movable manner, and a direction of the relative movement is parallel to the movable side edge of the flexible display screen; the two movable members are respectively hinged to the ends of the two telescopic rods that are connected to the fixed member; and the two transmission groups are respectively disposed on the fixed members in the two synchronization groups, and each of the transmission groups includes a transmission member that is connected to the two movable members in a relatively movable manner and configured to move the two movable members synchronously in the direction parallel to the movable side edge of the flexible display screen.

Optionally, each of the movable members includes a rack, and the transmission member includes at least one gear disposed between and engaged with two opposite racks, wherein both of the racks are parallel to the direction of the movable side edge of the flexible display screen and respectively integrated with the two movable members.

Optionally, each two adjacent sub-links of the same telescopic rod, and each of the sub-links correspondingly hinged to the two telescopic rods, are hinged by a first pin, and a resistance member is arranged between the first pin and a connecting hole in the sub-links in which the first pin is located, the resistance member being configured to allow the first pin and the connecting hole to be relatively static in the absence of an external force.

Optionally, the resistance member includes a helical elastic washer disposed circumferentially between the first pin and the connecting hole in a compressed state.

Optionally, in each of the synchronization groups, each of the movable members is hinged to one of the telescopic rods by a second pin, and the fixed member is provided with two sliding grooves into which the two second pins corresponding to the two movable members are respectively located and slidable along the sliding grooves.

Optionally, the support structure further includes a limit component configured to limit a minimum distance between the fixed and movable sides of the support component when the support component is in a retracted state.

Optionally, the limit component includes at least one stopper disposed on the fixed member of one of the synchronization groups and located between the fixed members of the two synchronization groups.

Optionally, the limit component includes two stopper groups, each of which includes at least one stopper, the stoppers in two stopper groups are respectively disposed on the fixed members of the two synchronization groups, and the stoppers in the two stopper groups are respectively located between the fixed members of the two synchronization groups.

To achieve the objects of the present disclosure, in another aspect, there is provided a display device, including a flexible display screen and a winding reel for winding the flexible display screen, and further including the support structure as described above, wherein the support structure is configured to enable different positions on the movable side edge of the flexible display screen away from the winding reel to be synchronously wound.

The present disclosure has the following beneficial effects:

the support structure provided in the present disclosure includes a support component and a synchronous transmission component, wherein the synchronous transmission component can make the movable side of the support component synchronously extend and retract at different positions in the direction parallel to the movable side edge of the flexible display screen so that when the flexible display screen is wound, the flexible display screen is supported at different positions in the direction parallel to the movable side edge of the flexible display screen at the same time, and so that the flexible display screen is always wound along a direction perpendicular to a central axis of the reel, thereby avoiding edge misalignment and middle bulging of the screen during the winding of the flexible display screen, and thus facilitating smooth winding of flexible display screen.

DETAILED DESCRIPTION OF THE EMBODIMENTS

Figure 1:
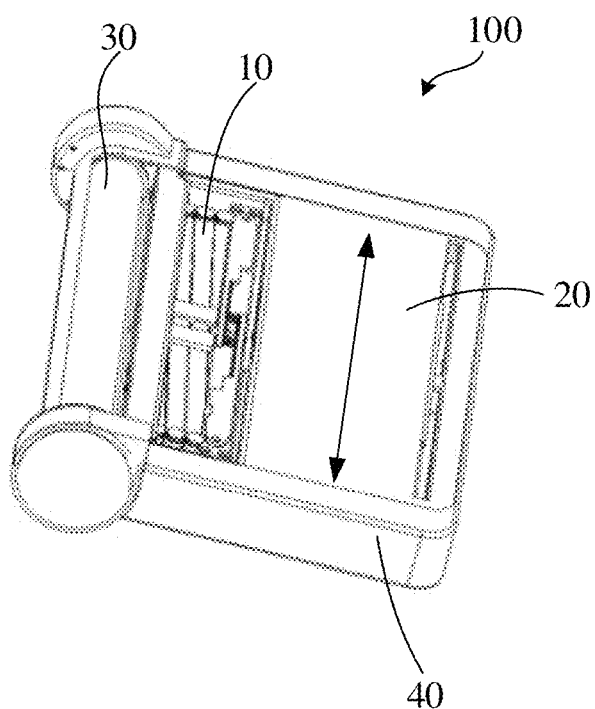
FIG. 1 is a schematic structural diagram of a display device (in a wound state) provided in an embodiment of the present disclosure.

The present application will now be described in detail below, and examples of embodiments of the present application will be shown in the drawings throughout which, the same or similar reference signs refer to the same or similar components or components with the same or similar functions. In addition, a detailed description of the known art is omitted if it is unnecessary for the shown features of the present application. The embodiments described below with reference to the drawings are merely illustrative, and are used only for the purpose of explaining the disclosure and should not be interpreted as limitations to the disclosure.

It will be understood by those skilled in the art that, unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the prior art and will not be interpreted in an idealized or overly formal sense unless expressly so defined herein.

Those skilled in the art will understand that as used herein, the singular forms "a", "an", "the" and "said" are intended to include the plural forms as well, unless expressly stated otherwise. It will be further understood that as used herein, the terms "comprises" and/or "comprising" specify the presence of stated features, integers, steps, operations, elements and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may also be present. Further, "connected" or "coupled" as used herein may include wirelessly connected or wirelessly coupled. As used herein, the term "and/or" includes all or any element and all combinations of one or more of the associated listed items.

The following describes the technical solution of the present application and how to solve the above technical problems in detail by specific embodiments.

In a first aspect, an embodiment of the present disclosure provides a support structure 10, which can be applied to a display device 100 as shown in FIG. 1 (a schematic structural diagram in a wound state). The display device 100 may be any display device with a flexible display screen 20, such as a display device applied to a tablet, a laptop, a projector or other devices. By using the support structure 10 provided in the embodiment of the disclosure, the flexible display screen 20 of the display device 100 is supported, thereby avoiding edge misalignment and middle bulging of the screen during the winding of the flexible display screen 20, and thus facilitating smooth winding of flexible display screen 20.

Figure 2:
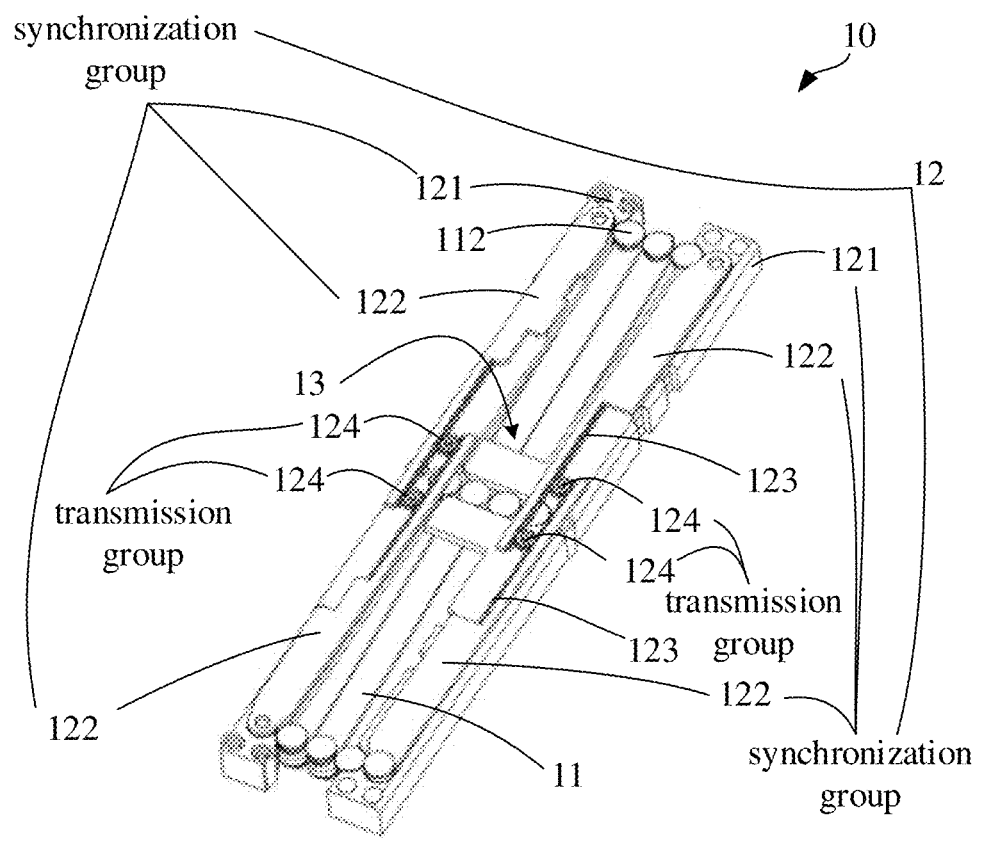
FIG. 2 is a schematic structural diagram of a support structure provided in an embodiment of the present disclosure in a retracted state.
Figure 3:
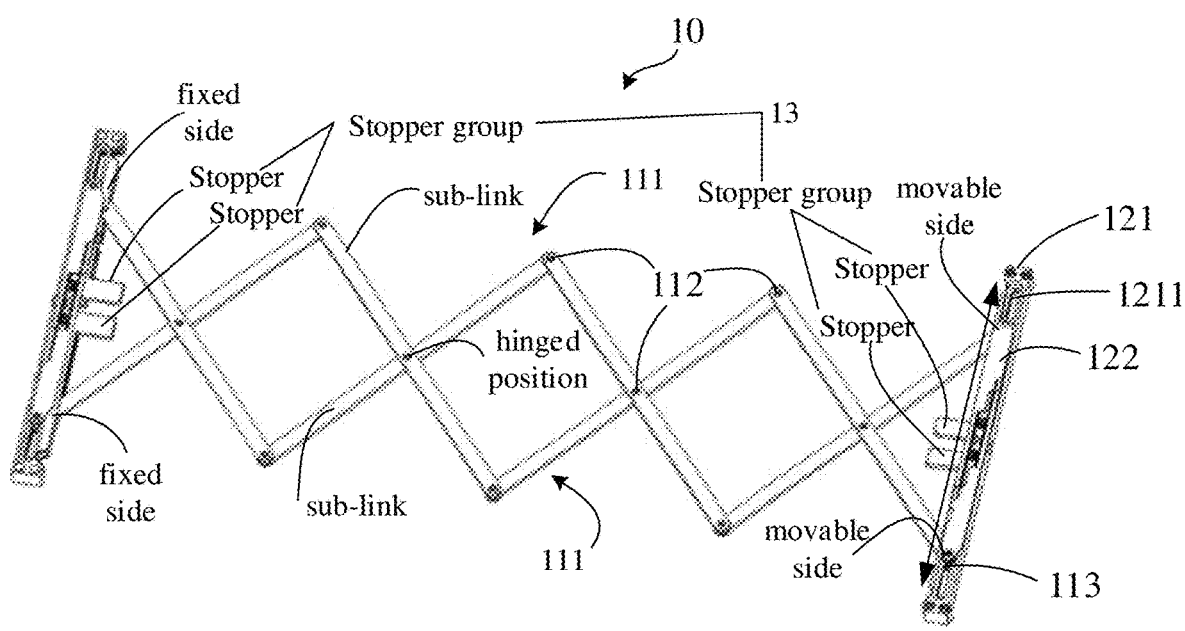
FIG. 3 is a schematic structural diagram of a support structure provided in an embodiment of the present disclosure in an extended state.

As shown in FIGS. 2 and 3, which are respectively schematic structural diagrams of the support structure 10 provided in the embodiment of the present disclosure in a retracted state and in an extended state, the support structure 10 includes a support component 11 and a synchronous transmission component 12. The support component 11 is configured to support the flexible display screen 20, has two telescopic rods, and has a fixed side fixed relative to a fixed side edge of the flexible display screen 20, and a movable side extendable and retractable with expansion or winding of a movable side edge of the flexible display screen 20. The synchronous transmission component 12 is connected to the support component 11, and is configured to move ends of the two telescopic rods 111 on the movable side of the support component 11 synchronously in a direction parallel to the movable side edge of the flexible display screen 20. Here, moving the ends of the two telescopic rods 111 on the movable side synchronously in the direction parallel to the movable side edge of the flexible display screen 20 may be interpreted as: moving the ends of the two telescopic rods on the movable side in the same direction at the same time by the same length at different positions in the direction indicated by the double-headed arrow of FIG. 3. The direction indicated by the double-headed arrow of FIG. 3 is parallel to the direction indicated by the double-headed arrow of FIG. 1, and the direction indicated by the double-headed arrow of FIG. 1 is parallel to the movable side edge of the flexible display screen.

The support structure 10 provided in an embodiment of the present disclosure includes a support component 11 and a synchronous transmission component 12. The synchronous transmission component 12 may move ends of the two telescopic rods 111 on the movable side of the support component 11 synchronously in a direction parallel to the movable side edge of the flexible display screen 20 so that when the flexible display screen 20 is wound, the support component 11 can support the flexible display screen 20 at different positions in the direction parallel to the movable side edge of the flexible display screen 20 at the same time, and so that the flexible display screen 20 is always wound along a direction perpendicular to a central axis of the reel, thereby avoiding edge misalignment and middle bulging of the screen during the winding of the flexible display screen 20, and thus facilitating smooth winding of flexible display screen 20.

It should be noted that the specific structures and materials of the support component 11 and the synchronous transmission component 12 are not limited herein as long as the support component 11 can, under the action of the synchronous transmission component 12, synchronously move the movable side thereof in the direction parallel to the movable side edge of the flexible display screen 20 and can support the flexible display screen 20 to a certain extent.

In a specific implementation of the present disclosure, each of the telescopic rods 111 includes a plurality of sub-links hinged end to end and having the same length; and the sub-links of the two telescopic rods 111 are hinged in a one-to-one correspondence manner with a hinged position located at a central position of the two hinged sub-links; and two ends of each telescopic rod 111 are respectively used as the fixed side and the movable side.

As shown in FIGS. 2 and 3, the sub-links of one of the telescopic rods 111 are hinged end to end to form a W-shaped telescopic structure between the fixed side and the movable side. The sub-links of the other telescopic rod 111 are hinged end to end to form an inverted W-shaped telescopic structure symmetrical to the W shape between the fixed side and the movable side, and the sub-links of the two telescopic rods 111 are hinged in a one-to-one correspondence manner. Therefore, by pulling the ends of the two telescopic rods 111 on the same side (the fixed side or the movable side) simultaneously, the two telescopic rods 111 are synchronously retracted and thus synchronously slid at two positions that are in the direction parallel to the movable side edge of the flexible display screen 20 and closer to the two side edges in a length direction of the flexible display screen 20, thereby avoiding edge misalignment and middle bulging of the screen during the winding of the flexible display screen 20.

It should be noted that the above is merely a preferred implementation of the present embodiment, and the present embodiment is not limited thereto. For example, the hinged position of the sub-links of the same telescopic rod 111 may be slightly shifted toward the middle, and the corresponding hinged position of the two telescopic rods 111 may also be shifted from the central position, as long as the two telescopic rods 111 can synchronously be slide at different positions in the direction parallel to the movable side edge of the flexible display screen 20.

In a specific implementation of the present disclosure, the synchronous transmission component 12 includes two synchronization groups and two transmission groups. One of the synchronization groups is connected to the fixed sides of two telescopic rods 111, and the other of the synchronization groups is connected to the movable sides of the two telescopic rods 111. Each of the synchronization groups includes a fixed member 121 and two movable members 122. The ends of the two telescopic rods 111 are connected to the fixed member 121 in a relatively movable manner, and a direction of the relative movement is parallel to the movable side edge of the flexible display screen 20. The two movable members 122 are respectively hinged to the ends of the two telescopic rods 111 that are connected to the fixed member 121. The two transmission groups are respectively disposed on the fixed members 121 in the two synchronization groups, and each of the transmission groups includes a transmission member that is connected to the two movable members 122 in a relatively movable manner and configured to move the two movable members 122 synchronously in the direction parallel to the movable side edge of the flexible display screen 20.

As shown in FIGS. 1 to 3, the fixed member 121 may be fixedly mounted on a housing 40 of the display device 100, and movably connected to the two telescopic rods 111 on the same side at the same time, which can be understood as that the ends of the two telescopic rods 111 on the same side are connected to the fixed member 121 in a relatively movable manner. Also, since the two movable members 122 are respectively hinged to the ends of the two telescopic rods 111 that are connected to the fixed member 121, it can be learned that the two movable members 122 on the same side (the fixed side or the movable side) of the telescopic rod 111 are both connected to the fixed member 121 in a relatively movably manner. When the housing 40 is pulled to extend or wind the flexible display screen 20, the fixed member 121 is moved along the direction in which the flexible display screen 20 is extended or wound, and drives the telescopic rod 111 to extend or retract so that the two movable members 122 hinged to the telescopic rod 111 are relatively moved on the fixed member 121. Since the transmission member is connected to the two movable members 122 in a relatively movable manner at the same time, the two movable members 122 may be moved synchronously in the direction parallel to the movable side edge of the flexible display screen 20 so that the two telescopic rods 111 hinged to the two movable members 122 are also synchronously retracted, thereby supporting the flexible display screen 20 at two positions that are in the direction parallel to the movable side edge of the flexible display screen 20 and closer to the two side edges in a length direction of the flexible display screen 20 at the same time, and thus avoiding edge misalignment and middle bulging of the screen during the winding of the flexible display screen 20.

It should be noted that the above is merely an optional implementation of the present embodiment, and the present embodiment is not limited thereto. For example, the telescopic rods 111 and the movable members 122 may be directly connected to the housing 40 of the display device 100, that is, the fixed members 121 may be understood as a part of the housing 40. The direction of the relative movement may form an angle with the movable side edge of the flexible display screen 20, as long as the two telescopic rods 111 can be synchronously retracted. In addition, the synchronous component may have other structures. For example, the telescopic rod 111 may also be connected to the fixed member 121 in a relatively movable manner, and is respectively connected to the ends of the two telescopic rods 111 on the same side via a telescopic drawstring or spring. A middle portion of the drawstring or the spring may be fixed at a middle portion of the fixed member 121, which can also realize the synchronous retraction of the two telescopic rods 111.

Further, as shown in FIGS. 2 and 3, each of the movable members 122 includes a rack 123, and the transmission member may include at least one gear 124 (two are shown in the figures) disposed between and engaged with two opposite racks 123. Each of the two racks 123 has an extending direction parallel to the direction of the movable side edge of the flexible display screen 20 and respectively integrated with the two movable members 122. Therefore, the engagement of the gear 124 and the rack 123 realizes the synchronous movement of the two movable members 122, and since the transmission of the gear 124 and the rack 123 is relatively accurate, the synchronous movement of the two movable members 122 can be further ensured. Specifically, one gear 124 may be provided at each of the fixed side and the movable side, and the gear 124 may be mounted on the fixed member 121 and rotatable about a central axis of itself. It should be noted that the above is merely a preferred implementation of the present embodiment, and the present embodiment is not limited thereto. For example, the transmission member may include only one roller, and the synchronous movement of the two movable members 122 is controlled by friction between the roller and both the two movable members 122.

In a specific implementation of the present disclosure, each two adjacent sub-links of the same telescopic rod 111, and/or each of the sub-links correspondingly hinged to the two telescopic rods 111, may be hinged by a first pin 112, and a resistance member may be arranged between the first pin 112 and a connecting hole in the sub-links in which the first pin is located, the resistance member being configured to allow the first pin 112 and the connecting hole to be relatively static in the absence of an external force. In this manner, when the housing 40 is pulled to retract the telescopic rod 111, the resistance member may generate a certain resistance against extension and retraction of the telescopic rod 111 so that the telescopic rod 111 may be extended and retracted under an external force, and remain static in the absence of an external force. That is, the telescopic rod 111 and the flexible display screen 20 may be pulled and stopped at any time during extension (or winding) of the display device 100, so that a size of a display area of the flexible display screen 20 can be controlled. It should be noted that the specific structure and material of the resistance member are not limited herein, as long as the first pin 112 and the connecting hole can be relatively static in the absence of an external force.

Specifically, the resistance member may include a helical elastic washer disposed circumferentially between the first pin 112 and the connecting hole in a compressed state. When the telescopic rod 111 is extended or retracted, a friction generated between the resistance member and the connecting hole may prevent the telescopic rod 111 from automatically extending under the action of self gravity when no external force is applied. It should be noted that the specific material of the helical elastic washer is not limited herein, which may be a rubber or metal material, as long as it can be compressed and contact the connecting hole to generate friction to keep the telescopic rod 111 static when no external force is applied.

In a specific implementation of the present disclosure, in each of the synchronization groups, each of the movable members 122 may be hinged to one of the telescopic rods 111 by a second pin 113, and the fixed member 121 may be provided with two sliding grooves 1211 into which the two second pins 113 corresponding to the two movable members 122 are respectively located and slidable along the sliding grooves 1211. In this manner, the second pins 113 for hinging the movable members 122 and the telescopic rods 111 is limited in the sliding grooves 1211 so that the moving direction of the movable members 122 can be further limited. Therefore, the movement of the movable members 122 is more stable, and thus the expansion and retraction of the telescopic rods 111 and the winding of the flexible display screen 20 are more stable and smooth. Specifically, a width of the sliding groove 1211 may be slightly larger than a diameter of the second pin 113, so as to facilitate the second pin 113 to slide in the sliding groove 1211. It should be noted that the present embodiment is not limited thereto. For example, the sliding groove 1211 may be an oblong hole, as long as a movement track of the second pin 113 is limited so that the movement is more stable.

In a specific implementation of the present disclosure, as shown in FIG. 2, the support structure 10 further includes a limit component 13 configured to limit a minimum distance between the fixed and movable sides of the support component 11 when the support component 11 is in a retracted state. Since the winding reel 30 of the display device 100 is usually provided with torsion springs at two ends, the torsion springs are compressed while the flexible display screen 20 is extended, and provide a winding torque while the flexible display screen 20 is wound so that under an external force, the housing 40 drives the flexible display screen 20 to be automatically wound under the torsion action of the torsion springs. Further, the limit component 13 is provided to limit the minimum distance between the fixed side and the movable side of the support component 11 when the support component is in a retracted state, thereby preventing the flexible display screen 20 from being stretched and pressed due to overly winding when it is automatically wound, and providing certain protection for the flexible display screen 20 to prolong the service life of the flexible display screen 20.

Specifically, the limit component 13 may include at least one stopper disposed on the fixed member 121 of one of the synchronization groups and located between the fixed members 121 of the two synchronization groups. Alternatively, the limit component 13 includes two stopper groups, each of which includes at least one stopper, the stoppers in the two stopper groups are respectively disposed on the fixed members 121 of the two synchronization groups, and the stoppers in the two stopper groups are respectively located between the fixed members 121 of the two synchronization groups. In this manner, the stopper or stopper group is secured to the fixed member 121 of certain side, and when the flexible display screen 20 is wound, the stopper or stopper group abuts against the fixed member 121 on the other side so that the support component 11 is limited to the minimum distance between the fixed side and the movable side in a retracted state, thereby limiting the winding of the flexible display screen 20 and preventing the flexible display screen 20 from being stretched and pressed due to overly winding of the flexible display screen 20.

It should be noted that the specific structure of the limit component 13 are not limited herein, as long as it can limit a minimum distance between the fixed and movable sides of the support component 11 when the support component 11 is in a retracted state. For example, the stopper may be a plate-like member extending from the fixed member 121 along an telescopic direction of the support component 11, and the stopper may be integrated with the fixed member. The minimum distance between the fixed and movable sides of the support component 11 is limited by a dimension of the plate-like member in the telescopic direction of the support component 11.

In a second aspect, based on the same concept as the above-mentioned support structure 10, an embodiment of the present disclosure provides a display device 100, including a flexible display screen 20 and a winding reel 30 for winding the flexible display screen 20, and further including a support structure 10 according to the first aspect for supporting a flexible display screen 20 and configured to enable different positions on the movable side edge of the flexible display screen 20 away from the winding reel 30 to be synchronously wound.

The display device 100 provided in this embodiment can achieve at least the beneficial effects that the support structure 10 can achieve, which will not be repeated here.

It will be appreciated that in the description of the present disclosure, orientation or position relationships referred by terms "central", "upper", "lower", "front", "back", "left", "right", "vertical", "horizontal", "top", "bottom", "inside", "outside" and the like are based on the orientation or position relationships shown in the drawings, and are merely for facilitating description of the disclosure and simplifying the description, instead of indicting or implying that the device or component referred to must have a specific orientation or must be configured or operated at a specific orientation, and thus cannot be interpreted as limitations to the present disclosure.

The foregoing is merely part of the implementations of the present disclosure, and it should be noted that modifications and refinements may be made by those skilled in the art without departing from the principles of the disclosure and these modifications and refinements should be considered as within the scope of the disclosure.

What is claimed is:

1. A support structure for supporting a flexible display screen, comprising a support component and a synchronous transmission component, wherein:
the support component comprises two telescopic rods, and has a fixed side fixed relative to a fixed side edge of the flexible display screen, and a movable side extendable and retractable with expansion or winding of a movable side edge of the flexible display screen; and
the synchronous transmission component is connected to the support component, and is configured to move ends of the two telescopic rods on the movable side of the support component synchronously in a direction parallel to the movable side edge of the flexible display screen,
wherein each of the telescopic rods comprises a plurality of sub-links hinged end to end and having the same length; and the sub-links of the two telescopic rods are hinged in a one-to-one correspondence manner with a hinged position located at a central position of the two hinged sub-links; and
two ends of each telescopic rod are respectively used as the fixed side and the movable side,
wherein the synchronous transmission component comprises two synchronization groups and two transmission groups, wherein
one of the synchronization groups is connected to the fixed sides of the two telescopic rods, and the other of the synchronization groups is connected to the movable sides of the two telescopic rods; each of the synchronization groups comprises a fixed member and two movable members, wherein the ends of the two telescopic rods are connected to the fixed member in a relatively movable manner, and a direction of the relative movement is parallel to the movable side edge of the flexible display screen; the two movable members are respectively hinged to the ends of the two telescopic rods that are connected to the fixed member; and
the two transmission groups are respectively disposed on the fixed members in the two synchronization groups, and each of the transmission groups comprises a transmission member that is connected to the two movable members in a relatively movable manner and configured to move the two movable members synchronously in the direction parallel to the movable side edge of the flexible display screen,
wherein each of the movable members comprises a rack, and the transmission member comprises at least one gear disposed between and engaged with two opposite racks, wherein both of the racks are parallel to the direction of the movable side edge of the flexible display screen and respectively integrated with the two movable members.

2. The support structure according to claim 1, wherein each two adjacent sub-links of the same telescopic rod, and each of the sub-links correspondingly hinged to the two telescopic rods, are hinged by a first pin.

3. The support structure according to claim 2, wherein the resistance member comprises a helical elastic washer disposed circumferentially between the first pin and the connecting hole in a compressed state.

4. The support structure according to claim 1, wherein in each of the synchronization groups, each of the movable members is hinged to one of the telescopic rods by a second pin, and the fixed member is provided with two sliding grooves into which the two second pins corresponding to the two movable members are respectively located and slidable along the sliding grooves.

5. The support structure according to claim 1, further comprising a limit component configured to limit a minimum distance between the fixed and movable sides of the support component when the support component is in a retracted state.

6. The support structure according to claim 5, wherein the limit component comprises at least one stopper disposed on the fixed member of one of the synchronization groups and located between the fixed members of the two synchronization groups.

7. The support structure according to claim 5, wherein the limit component comprises two stopper groups, each of which comprises at least one stopper, the stoppers in the two stopper groups are respectively disposed on the fixed members of the two synchronization groups, and the stoppers in the two stopper groups are respectively located between the fixed members of the two synchronization groups.

8. A display device, comprising a flexible display screen and a winding reel for winding the flexible display screen, and further comprising the support structure according to claim 1, wherein the support structure is configured to enable different positions on the movable side edge of the flexible display screen away from the winding reel to be synchronously wound.

* * * * *